US011410387B1

(12) United States Patent
Alderman et al.

(10) Patent No.: US 11,410,387 B1
(45) Date of Patent: Aug. 9, 2022

(54) SYSTEMS, METHODS, AND MEDIA FOR GENERATING VISUALIZATION OF PHYSICAL ENVIRONMENT IN ARTIFICIAL REALITY

(71) Applicant: Facebook Technologies, LLC, Menlo Park, CA (US)

(72) Inventors: Matthew James Alderman, Redmond, WA (US); Gaurav Chaurasia, Zürich (CH); Paul Timothy Furgale, Thalwil (CH); Lingwen Gan, Sunnyvale, CA (US); Alexander Sorkine Hornung, Zürich (CH); Alexandru-Eugen Ichim, Eschlikon (CH); Arthur Nieuwoudt, San Carlos, CA (US); Jan Oberländer, Binningen (CH); Gian Diego Tipaldi, Zürich (CH)

(73) Assignee: Facebook Technologies, LLC., Menlo Park, CA (US)

( * ) Notice: Subject to any disclaimer, the term of this patent is extended or adjusted under 35 U.S.C. 154(b) by 323 days.

(21) Appl. No.: 16/746,128

(22) Filed: Jan. 17, 2020

(51) Int. Cl.
*G06T 17/20* (2006.01)
*G06T 7/579* (2017.01)

(52) U.S. Cl.
CPC ............ *G06T 17/205* (2013.01); *G06T 7/579* (2017.01); *G06T 2210/21* (2013.01)

(58) Field of Classification Search
CPC ....... G02B 27/017; G06F 3/011; G06T 15/20; G06T 19/006; G06T 2207/10004; G06T 2207/10028; G06T 2207/20081; G06T 2207/20084; G06T 7/11; G06T 17/20; G06T 19/20; G06T 17/205; G06T 15/04;
(Continued)

(56) References Cited

U.S. PATENT DOCUMENTS 5,710,877 A   1/1998  Marimont et al.
9,576,367 B2  2/2017  You et al.
(Continued)

FOREIGN PATENT DOCUMENTS

EP    2660643 A2   11/2013
EP    3163407 A1   5/2017
(Continued)

OTHER PUBLICATIONS

International Search Report and Written Opinion for International Application No. PCT/US2020/067020.
(Continued)

*Primary Examiner* — Abderrahim Merouan
(74) *Attorney, Agent, or Firm* — Baker Botts L.L.P.

(57) ABSTRACT

In one embodiment for generating passthrough, a computing system may access images of an environment captured by cameras of a device worn by a user. The system may generate, based on the images, depth measurements of objects in the environment. The system may generate a mesh covering a field of view of the user and then update the mesh based on the depth measurements to represent a contour of the objects in the environment. The system may determine a first viewpoint of a first eye of the user and render a first output image based on the first viewpoint and the updated mesh. The system may then display the first output image on a first display of the device, the first display being configured to be viewed by the first eye of the user.

20 Claims, 10 Drawing Sheets

(58) Field of Classification Search
CPC . G06T 17/00; G06T 17/10; G06T 2219/2021; H04N 13/117; H04N 13/156; H04N 13/161; H04N 13/232; H04N 13/243; H04N 13/344; H04N 13/366; H04N 19/162; H04N 19/176; H04N 19/44; H04N 19/597; H04N 19/91; H04N 5/2226; H04N 5/2258

See application file for complete search history.

(56) References Cited

U.S. PATENT DOCUMENTS

| | | | |
|---|---|---|---|
| 9,836,839 | B2 | 12/2017 | Champlin et al. |
| 10,124,257 | B2 | 11/2018 | Stafford |
| 10,776,997 | B2* | 9/2020 | Schmalstieg ........... G06T 15/04 |
| 10,817,749 | B2 | 10/2020 | Biswas et al. |
| 10,987,579 | B1* | 4/2021 | Borovikov ............ A63F 13/355 |
| 10,997,752 | B1 | 5/2021 | Yoo et al. |
| 11,158,091 | B2 | 10/2021 | Panetta et al. |
| 2003/0034974 | A1 | 2/2003 | Welch |
| 2012/0092328 | A1 | 4/2012 | Flaks |
| 2013/0005467 | A1 | 1/2013 | Kim |
| 2013/0093788 | A1 | 4/2013 | Liu |
| 2014/0306951 | A1* | 10/2014 | Toiyama ................. G06T 19/20 345/419 |
| 2015/0235610 | A1 | 8/2015 | Miller |
| 2015/0249839 | A1* | 9/2015 | Shimizu ............... H04N 19/597 375/240.16 |
| 2016/0163028 | A1 | 6/2016 | Xu et al. |
| 2017/0052507 | A1* | 2/2017 | Poulos ...................... G06F 3/00 |
| 2017/0052595 | A1* | 2/2017 | Poulos ................ G06F 3/04847 |
| 2017/0287215 | A1 | 10/2017 | Lalonde |
| 2017/0365100 | A1 | 12/2017 | Walton |
| 2018/0067316 | A1 | 3/2018 | Lee |
| 2018/0068488 | A1 | 3/2018 | Hart |
| 2018/0088323 | A1 | 3/2018 | Bao |
| 2018/0176483 | A1 | 6/2018 | Knorr et al. |
| 2018/0232056 | A1 | 8/2018 | Nigam |
| 2018/0364801 | A1 | 12/2018 | Kim |
| 2019/0096119 | A1* | 3/2019 | Petkov .................. G06T 15/005 |
| 2019/0101758 | A1 | 4/2019 | Zhu |
| 2019/0197765 | A1* | 6/2019 | Molyneaux ............. G06T 17/20 |
| 2019/0213789 | A1 | 7/2019 | Uyyala |
| 2019/0220002 | A1 | 7/2019 | Huang |
| 2019/0243448 | A1 | 8/2019 | Miller |
| 2019/0362505 | A1* | 11/2019 | Kobayashi ................ G06T 3/40 |
| 2020/0020166 | A1 | 1/2020 | Menard |
| 2020/0026922 | A1 | 1/2020 | Pekelny |
| 2020/0238909 | A1* | 7/2020 | Yamamoto ................ B60R 1/00 |
| 2020/0280678 | A1* | 9/2020 | Hariyani .............. H04N 17/002 |
| 2020/0296354 | A1* | 9/2020 | Bickerstaff ........ G02B 27/0093 |
| 2020/0334908 | A1 | 10/2020 | Wilson |
| 2021/0201071 | A1 | 7/2021 | Liao et al. |

FOREIGN PATENT DOCUMENTS

| | | |
|---|---|---|
| GB | 2376397 A | 12/2002 |
| WO | WO 2017/079657 | 5/2017 |

OTHER PUBLICATIONS

International Search Report and Written Opinion for International Application No. PCT/US2020/067055.

Ballan, et al., Unstructured Video-Based Rendering: Interactive Exploration of Casually Captured Videos, ACM Trans. Graph. (Proc. SIGGRAPH) 29, Article 87, Issue 4, 11 pages, Jul. 2010.

Chaurasia, et al., Depth Synthesis and Local Warps for Plausible Image-based Navigation, ACM Trans Graph 32, 3, Article 30, 12 pages, Jun. 2013.

Chaurasia, et al., Silhouette-Aware Warping for Image-Based Rendering. Comput. Graph. Forum (Proc. EGSR)30, 4 (2011), pp. 1223-1232, 2011.

Chen, QuickTime VR—An Image-Based Approach to Virtual Environment Navigation. In ACM SIGGRAPH 1995 Conference Proceedings, pp. 29-38, 1995.

Chen, et al., View Interpolation for Image Synthesis, in ACM SIGGRAPH 1993 Conference Proceedings, pp. 279-288, 1993.

Fanello, et al., Low Compute and Fully Parallel Computer Vision with HashMatch, In the IEEE International Conference on Computer Vision (ICCV), pp. 1-11, 2017.

Gu, et al., Application of Motion Vector in Live 3D Object Reconstruction, Patterns 2011: The Third International Conferences on Pervasive Patterns and Applications, pp. 41-46, 2011.

Hedman, et al., Casual 3D Photography, ACM Transactions on Graphics, Article 234, 36(6):1-15, 2017.

Hedman, et al., Instant 3D Photography, ACM Transactions on Graphics, Article 101, 37(4):1-12, Aug. 2018.

Hirschmuller, et al., Memory Efficient Semi-Global Matching, ISPRS Annals of the Photogrammetry, Remote Sensing and Spatial Information Sciences, vol. 1-3, 2012 XXII ISPRS Congress, Melbourne, Australia, pp. 371-376, Sep. 2012.

Hirschmuller, et al., Stereo Processing by Semiglobal Matching and Mutual Information, IEEE Transactions on Pattern Analysis and Machine Intelligence, 30(2):328-341, Feb. 2008.

Holynski, et al., Fast Depth Densification for Occlusion-aware Augmented Reality, ACM Transactions on Graphics, Article 194, 37(6): 1-11, Nov. 2018.

Hornung, et al., Interactive Pixel-Accurate Free Viewpoint Rendering from Images with Silhouette Aware Sampling, Computer Graphics, 0(1981): 1-13, 2009.

Kanade, et al., A Stereo Machine for Video-rate Dense Depth Mapping and Its New Applications, Proceedings of 15th Computer Vision and Pattern Recognition Conference (CVPR), San Francisco, pp. 1-7, Jun. 1996.

Kang, et al., Extracting View-Dependent Depth Maps from a Collection of Images, International Journal of Computer Vision 58(2): 139-163, 2004.

Levin, et al., Colorization using Optimization, The Hebrew University of Jerusalem, ACM 0733-0301/04/01)00-0689, pp. 689-694, 2004.

Lipski, et al., Virtual Video Camera: Image-Based Viewpoint Navigation Through Space and Time, Computer Graphics, pp. 1-12, 2010.

Martino, et al., An Analysis and Implementation of Multigrid Poisson Solvers with Verified Linear Complexity, Image Processing on Line 8 (2018), pp. 192-218, 2018.

Matzen, et al., Low-Cost 360 Stereo Photography and Video Capture, ACM Transactions on Graphics, Article 148, 36(4): 1-13, Jul. 2017.

McMillan, et al., Plenoptic Modeling: An Image-Based Rendering System, Proceedings of SIGGRAPH 95, Los Angeles, California, pp. 1-8, Aug. 1995.

Nover, et al., ESPReSSo: Efficient Slanted PatchMatch for Real-time Spacetime Stereo, Google, pp. 1-9.

Perez, et al., Poisson Image Editing, Microsoft Research UK, CM 0730-0301 03 0700-0313, pp. 313-318, 2003.

Shum, et al., Image-Based Rendering, Springer Science Business Media, LLC, 213 pages, 2007.

Sinha, et al., Piecewise Planar Stereo for Image-based Rendering, Microsoft, pp. 1-8.

Stich, et al., View and Time Interpolation in Image Space, Pacific Graphics, 27(7): 1-7, 2008.

Szeliski, Computer Vision: Algorithms and Applications, pp. 1-481, Aug. 5, 2010.

Szeliski, et al., Locally Adapted Hierarchical Basis Preconditioning, Microsoft Research, pp. 1-39, May 2006.

Valentin, et al., Depth from Motion for Smartphone AR, CM Trans. Graph., Article 193, 37(6): 1-19, Nov. 2018.

Vangorp, et al., Perception of Perspective Distortions in Image-Based Rendering, ACM Trans Graph, 32(4): 1-35, Jul. 2013.

Vangorp, et al., Perception of Visual Artifacts in Image-Based Rendering of Facades, Computer Graphics Forum, Wiley, Proceedings of the Eurographics Symposium on Rendering, 30(4): 1-11, Jul. 8, 2011.

(56) References Cited

OTHER PUBLICATIONS

Zitnick, et al., High-quality video view interpolation using a layered representation, ACM 073341301/04.42000.0700, pp. 600-608, 2004.
Zitnick, et al., Stereo for Image-Based Rendering using Image Over-Segmentation, Kluwer Academic Publishers, pp. 1-32, 2006.
Chen S.E., "QuickTime VR—An Image-Based Approach to Virtual Environment Navigation," Proceedings of the 22nd annual conference on Computer graphics and interactive techniques, SIGGRAPH, 1995, pp. 29-38.
Grauman K., et al., "Synthesis Lectures on Artificial Intelligence and Machine Learning," Visual Object Recognition, 2011, 183 pages.
Hirschmuller H., et al., "Stereo Processing by Semiglobal Matching and Mutual Information," IEEE Transactions on Pattern Analysis and Machine Intelligence, Feb. 2008, vol. 30 (2), pp. 328-341.
Jeon H.G., et al., "Stereo Matching with Color and Monochrome Cameras in Low-Light Conditions," IEEE Conference an Computer Vision and Pattern Recognition, 2016, 9 pages.
Jeon H.G., et al., "Stereo Matching with Color and Monochrome Cameras in Low-Light Conditions," IEEE Conference on Computer Vision and Pattern Recognition, 2016, pp. 4086-4094.
Ji Y., et al., "Rendering Grayscale Image Using Color Feature," Proceedings of the Seventh International Conference an Machine Learning and Cybernetics, Kunming, Jul. 12-15, 2008, pp. 3017-3020.
Joo M., et al., "Heuristic Threshold for Histogram-based Binarization of Grayscale Images," Industrial Data, 2014, vol. 17 (1), pp. 97-100.
Zare M., et al., "A Heuristic Method for Gray Images Pseudo Coloring With Histogram and RGB Layers," IEEE, 2011, pp. 524-527.

\* cited by examiner

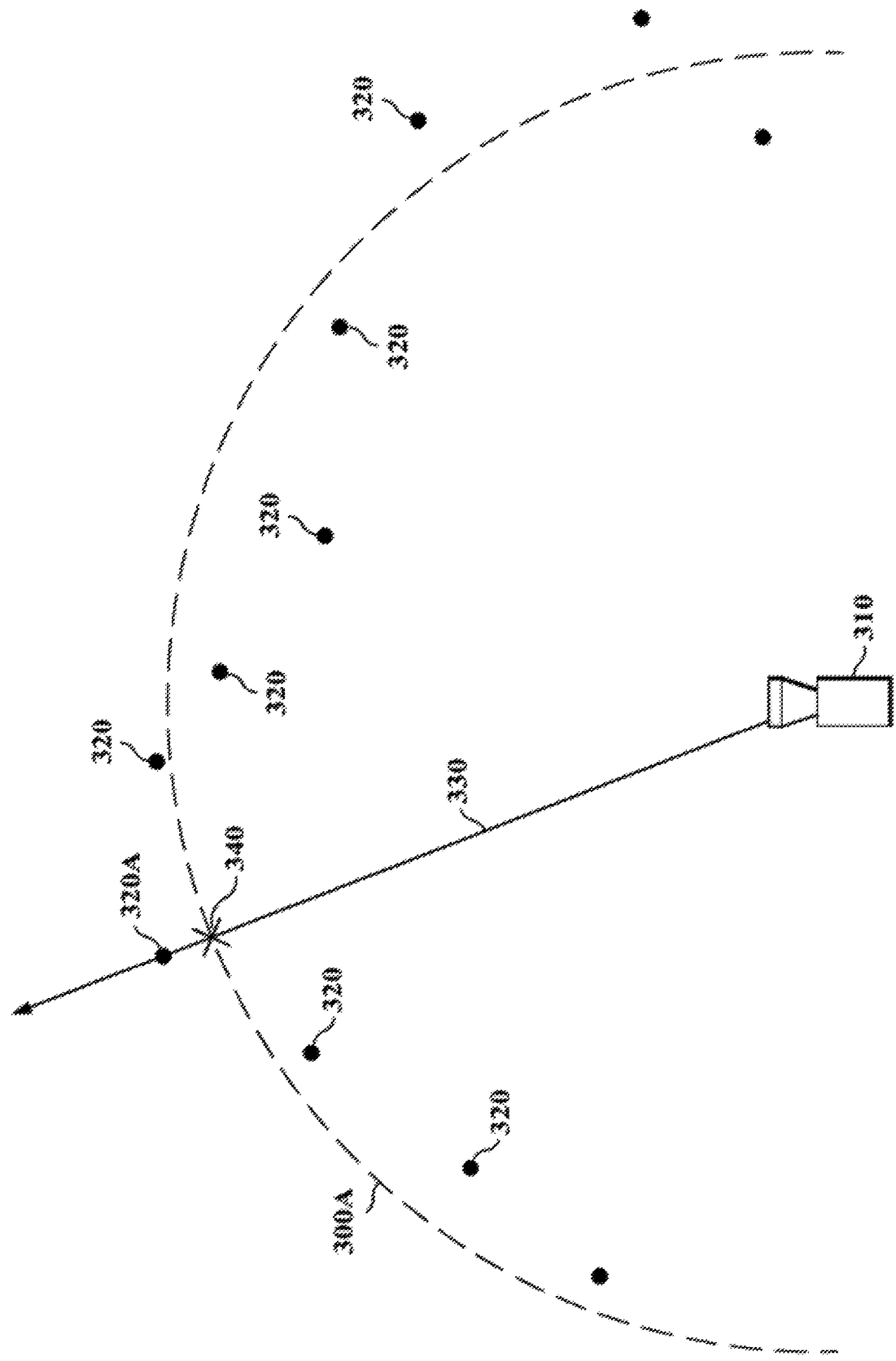

SYSTEMS, METHODS, AND MEDIA FOR GENERATING VISUALIZATION OF PHYSICAL ENVIRONMENT IN ARTIFICIAL REALITY

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

Embodiments described herein cover systems, methods, and media configured to generate 3D passthrough on a resource-limited device (e.g., a mobile phone may be the main computational unit for the HMD). Unlike systems with powerful computational resources (e.g., a desktop or laptop computer), a resource-limited device may not have the hardware (e.g., GPU) to use computationally expensive algorithms (e.g., optical flow). Thus, optimizations to the passthrough generation process are needed in order to enable passthrough on resource-limited devices.

In one embodiment for generating passthrough, a computing system may access images of an environment captured by cameras of a device worn by a user. The system may generate, based on the images, depth measurements of objects in the environment. The system may generate a mesh covering a field of view of the user and then update the mesh based on the depth measurements to represent a contour of the objects in the environment. The system may determine a first viewpoint of a first eye of the user and render a first output image based on the first viewpoint and the updated mesh. The system may then display the first output image on a first display of the device, which is configured to be viewed by the first eye of the user.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A and 3B provide top-down illustrations of a 3D mesh being deformed to represent the contours of an observed environment, in accordance with particular embodiments.

DESCRIPTION OF EXAMPLE EMBODIMENTS

"Passthrough" is a feature that allows a user to see his physical surroundings while wearing an HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective.

In addition, since the images have no depth, simply displaying the images would not provide the user with proper parallax effects if he were to shift away from where the images were taken. Incorrect parallax, coupled with user motion, could lead to motion sickness. Thus, to generate correct parallax, particular embodiments of the passthrough feature extracts information about the environment from the captured images (e.g., depth information), use the information to generate a 3D model (a geometric scene representation) of the environment, and reconstruct a scene of the modeled environment from the user's current viewpoint.

Photon-to-visuals latency is another issue addressed by the passthrough feature. The delay between a photon hitting the camera and it appearing on the screen (as part of the captured image) determines the visual comfort of interacting in a dynamic world. Particular embodiments of the passthrough feature overcomes this issue by updating the 3D model representation of the environment based on images captured at a sufficiently high rate (e.g., at 30 Hz, 60 Hz, etc.) and rendering images based on the latest known head pose of the user.

Figure 1A:
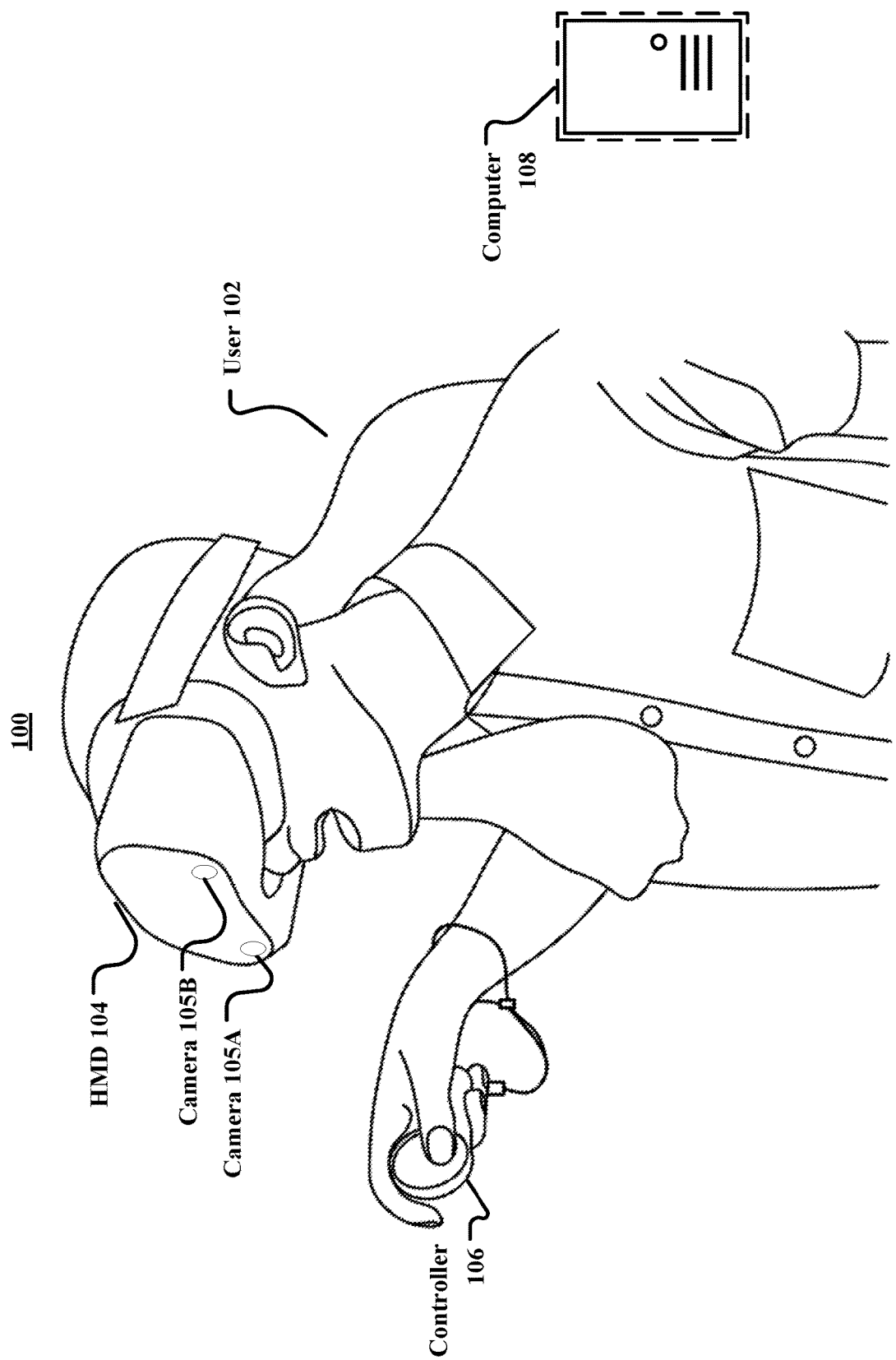
FIG. 1A illustrates an example artificial reality system worn by a user, in accordance with particular embodiments.

FIG. 1A illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

Figure 1B:
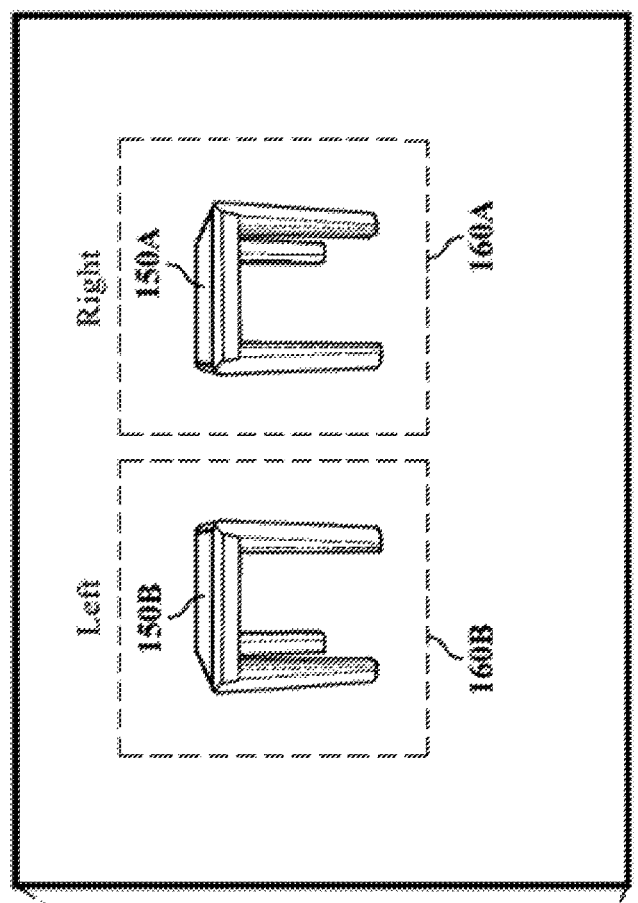
FIG. 1B illustrates an example of a passthrough feature, in accordance with particular embodiments.
Figure 1B:
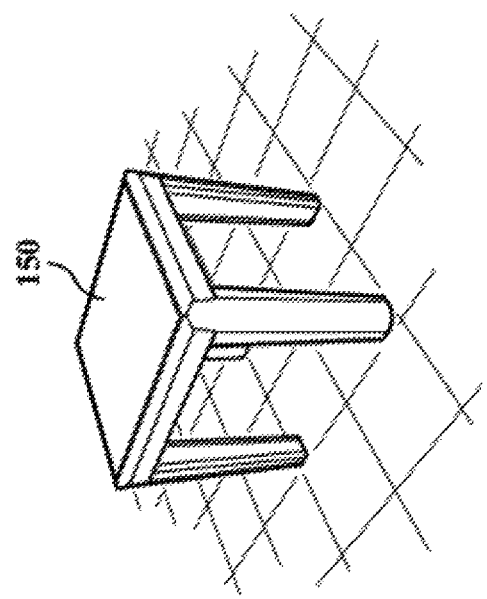
Figure 1B:
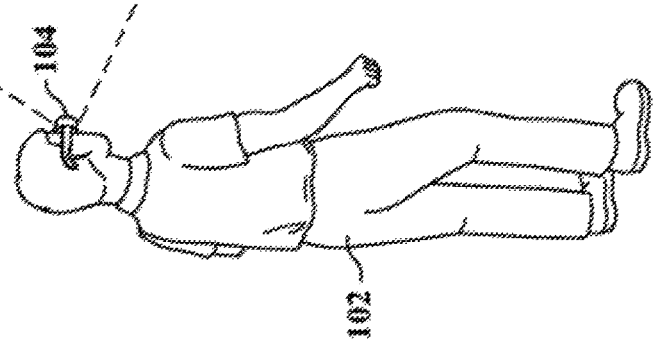

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to directly see the table 150. To help the user perceive his physical surroundings while wearing the HMD 104, the passthrough feature captures information about the physical environment using, for example, the aforementioned external-facing cameras 105A-B. The captured information may then be re-projected to the user 102 based on his viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

Referring again to FIG. 1A, the HMD 104 may have external-facing cameras, such as the two forward-facing cameras 105A and 105B shown in FIG. 1A. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 105A-B may be directly displayed to the user 102 via the HMD 104, doing so would not provide the user with an accurate view of the physical environment since the cameras 105A-B cannot physically be located at the exact same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller.

For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

In embodiments where the computing unit 108 is a high-performance device, an embodiment of the passthrough feature may be designed as follows. Through the external-facing cameras 105A-B of the HMD 104, a sequence of images of the surrounding physical environment may be captured. The information captured by the cameras 105A-B, however, would be misaligned with what the user's eyes would capture since the cameras could not spatially coincide with the user's eyes (e.g., the cameras would be located some distance away from the user's eyes and, consequently, have different viewpoints). As such, simply displaying what the cameras captured to the user would not be an accurate representation of what the user should perceive.

Instead of simply displaying what was captured, the passthrough feature would re-project information captured by the external-facing cameras 105A-B to the user. Each pair of simultaneously captured stereo images may be used to estimate the depths of observed features. As explained above, to measure depth using triangulation, the computing unit 108 would need to find correspondences between the stereo images. For example, the computing unit 108 would determine which two pixels in the pair of stereo images correspond to the same observed feature. A high-performance computing unit 108 may solve the correspondence problem using its GPU and optical flow techniques, which are optimized for such tasks. The correspondence information may then be used to compute depths using triangulation techniques. Based on the computed depths of the observed features, the computing unit 108 could determine where those features are located within a 3D space (since the computing unit 108 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras 105A-B.

The process described above, however, may not be feasible for a resource-limited computing unit (e.g., a mobile phone may be the main computational unit for the HMD). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths, as described above with reference to FIG. 2.

Figure 2:
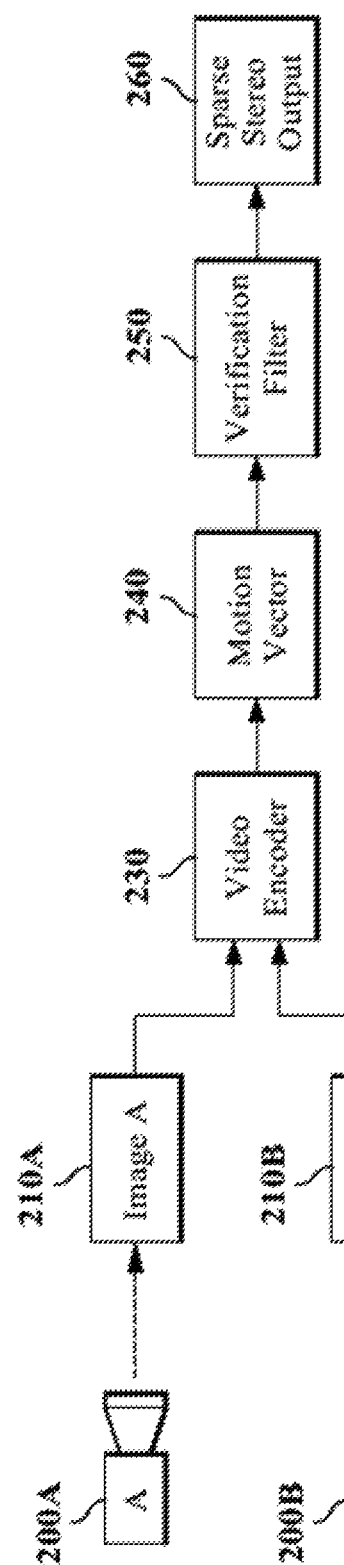
FIG. 2 illustrates an optimized depth estimation technique that leverages a device's video encoder, in accordance with particular embodiments.

FIG. 2 illustrates an optimized depth estimation technique that leverages a device's video encoder 230, in accordance with particular embodiments. A video encoder 230 (hardware or software) is designed to be used for video compression to predict the motion of pixels in successive video frames to avoid storing repetitions of the same pixel. It is common on any computing device capable of capturing and displaying video, even resource-limited ones like mobile phones. The video encoder 230 achieves compression by leveraging the temporal consistency that is often present between sequential frames. For example, in a video sequence captured by a camera that is moving relative to an environment, the frame-by-frame difference would likely be fairly minimal. Most objects appearing in one frame would continue to appear in the next, with only slight offsets relative to the frame due to changes in the camera's perspective. Thus, instead of storing the full color values of all the pixels in every frame, the video encoder predicts where the pixels in one frame (e.g., a frame at time t, represented by $f_t$) came from in a previous frame (e.g., a frame at time t−1, represented by $f_{t-1}$), or vice versa. The encoded frame may be referred to as a motion vector. Each grid or cell in the motion vector corresponds to a pixel in the frame $f_t$ that the motion vector is representing. The value in each grid or cell stores a relative offset in pixel space that identifies the likely corresponding pixel location in the previous frame $f_{t-1}$. For example, if the pixel at coordinate (10, 10) in frame $f_t$ corresponds to the pixel at coordinate (7, 8) in the previous frame $f_{t-1}$, the motion vector for frame $f_t$ would have grid or cell at coordinate (10, 10) that specifies a relative offset of (−3, −2) that could be used to identify the pixel coordinate (7, 8).

In particular embodiments, the correspondences between two stereo images may be computed using a device's video encoder. FIG. 2 shows two stereo cameras 200A and 200B that simultaneously capture a pair of stereo images 210A and 210B, respectively. Using an API provided for the device's video encoder, the passthrough feature may instruct the video encoder 230 to process the two stereo images 210A and 210B. However, since video encoders 230 are designed to find correspondence between sequential frames captured at a high frame rate (e.g., 30, 60, 80, or 100 frames-per-second), which means that sequential frames are likely very similar, having the video encoder 230 find correspondences between two simultaneously captured stereo images 210A-210B may yield suboptimal results. Thus, in particular embodiments, one or both of the images 210A-210B may undergo a translation based on the known physical separation between the two cameras 200A and 200B so that the images 210A and 210B would be more similar.

The output of the video encoder 230 may be a motion vector 240 that describes the predicted correspondences between images 210A and 210B using per-pixel offsets. The motion vector 240, however, could be noisy (i.e., many of the correspondences could be inaccurate). Thus, in particular embodiments, the motion vector 240 may undergo one or more verification filters 250 to identify the more reliable correspondence predictions. For example, one verification filter 250 may use the known geometry of the cameras 200A and 200B to determine epipolar lines for each pixel. Using the epipolar line associated with each pixel, the computing device could determine whether the corresponding pixel as identified by the motion vector 240 is a plausible candidate. For example, if the corresponding pixel falls on or within a threshold distance of the epipolar line, then the corresponding pixel may be deemed plausible. Otherwise, the corresponding pixel may be deemed implausible and the correspondence result would be rejected from being used in subsequent depth computations.

In particular embodiments, the verification filter 250 may assess the reliability of a correspondence found by the motion vector 240 based on temporal observations. This temporal filtering process may be applied to the original motion vector 240 or only to a subset of the motion vector 240 that survived the epipolar filtering process. For each correspondence undergoing the temporal filtering process, the system may compute the depth value using triangulation. The depth values may be represented as a point cloud in 3D space. The temporal filtering process may check whether the same points can be consistently observed through time. For example, the computing system may have a camera capture an image from a particular current perspective and compare it to a projection of the point cloud into a screen space associated with the current perspective. As an example, given the current perspective, the device may compute where, in screen space (e.g., the location of a particular pixel), the user should see each point in the point cloud. This may be done by projecting each point towards a point representation of the current perspective. As each point is being projected, it passed through a screen space of the current perspective. The location where the projected point intersects the screen space corresponds to a pixel location where that point is expected to appear. By comparing the projected pixel location to the same pixel location in the captured image, the system could determine whether the two pixels likely correspond to each other. If so, that point in the point cloud gets a positive vote; otherwise, it gets a negative vote. The points with a sufficiently high vote would be used as the final set of reliable points.

After the verification filtering process 250, the system would have a collection of stereo outputs or depth measurements 260. The collection 260 may be very sparse (or low resolution). For example, if each image has a resolution of 640×480 pixels, that means a high-accuracy correspondence could yield upwards of 307,200 depth measurements or points. Due to the noise and inaccuracy of the motion vector 240, the number of reliable points after the verification filtering process 250 may be in the range of, e.g., 1000-3000 points. Having a non-uniform density of the collection of depth measurements means that geometry information is lacking in certain regions. As such, particular embodiments may perform a densification process to fill in the missing depth information.

Once the computing device has generated a point cloud (whether dense or sparse) based on the depth measurements, it may generate a 3D mesh representation of a contour of the observed environment. For high-performance devices, accurate models of objects in the environment may be generated (e.g., each object, such as a table or a chair, may have its own 3D model). However, for resource-limited devices, the cost of generating such models and/or the underlying depth measurements for generating the models may be prohibitive. Thus, in particular embodiments, the 3D mesh representation for the environment may be a coarse approximation of the general contour of the objects in the environment. The 3D mesh, which may be represented as a depth map, may therefore have incomplete information (e.g., certain grids on the mesh may not have a corresponding verified depth measurement). In particular embodiments, a single 3D mesh may be used to approximate all the objects observed. Conceptually, the 3D mesh is analogous to a blanket or sheet that covers the entire observable surfaces in the environment.

Figure 3B:
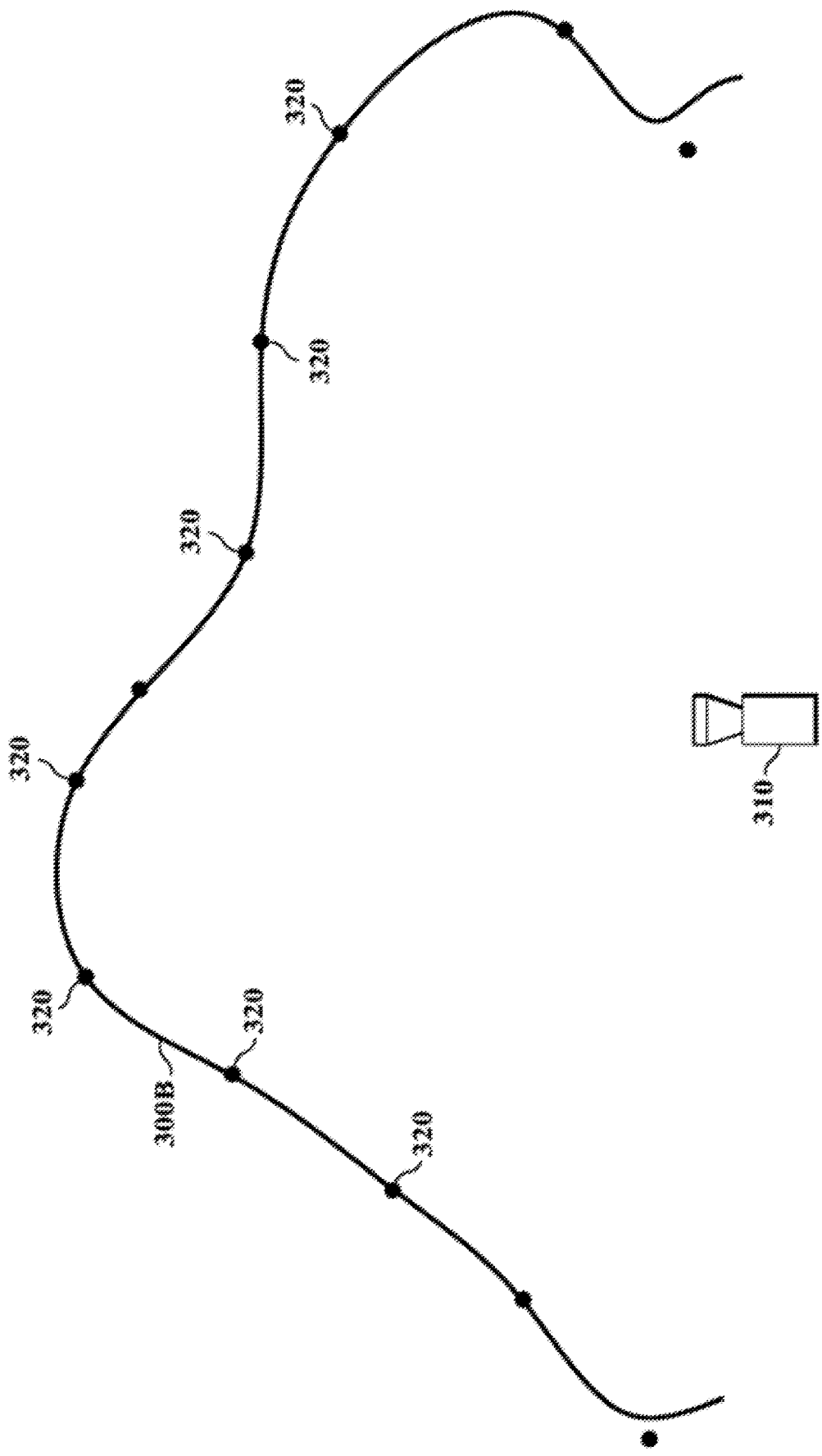

FIGS. 3A and 3B provide top-down illustrations of a 3D mesh being deformed to represent the contours of an observed environment. For clarity, the figures are drawn in 2D, but it should be understood that the 3D mesh is a 3D construct. FIG. 3A illustrates an embodiment of the 3D mesh 300A being initialized to be equal-distance (e.g., 1, 2, 2.5, or 3 meters) from a viewer 310 (represented by a camera). In the particular example being shown, the radius of the 3D mesh 300A is 2 meters. Since the 3D mesh 300A is equal-distance away from the viewer 310, it forms a hemisphere around the user. For clarity, FIG. 3A illustrates a portion of a cross-section of that hemisphere, resulting in the half-circle shown. FIG. 3A further illustrates points (e.g., 320) in the point cloud that are deemed reliable. These points 320 represent observed features in the environment and may be generated using the embodiments described elsewhere herein.

The 3D mesh 300A may be deformed according to the points 320 in order to model the contour of the environment. In particular embodiments, the 3D mesh 300A may be deformed based on the viewer's 310 position and the points 320 in the point cloud. To determine which portion of the 3D mesh 300A corresponds to each point in the point cloud 320, the computing device may cast a conceptual ray from the viewer's 310 position towards that point. Each ray would intersect with a primitive (e.g., a triangle or other polygon) of the 3D mesh. For example, FIG. 3A shows a ray 330 being cast from the viewer 310 towards point 320A. The ray 330 intersects the 3D mesh 300A at a particular location 340. As a result, mesh location 340 is deformed based on the depth value associated with the point 320A. For example, if the point 320 is 2.2 meters away from the viewer 310, the depth value associated with the mesh location 340 may be updated to become 2.2 meters from its initial value of 2 meters. FIG. 3B illustrates the deformed 3D mesh 300B that may result from the deformation process. At this point, the deformed mesh 300B represents the contour of the physical environment observed by the viewer 310.

Figure 4:
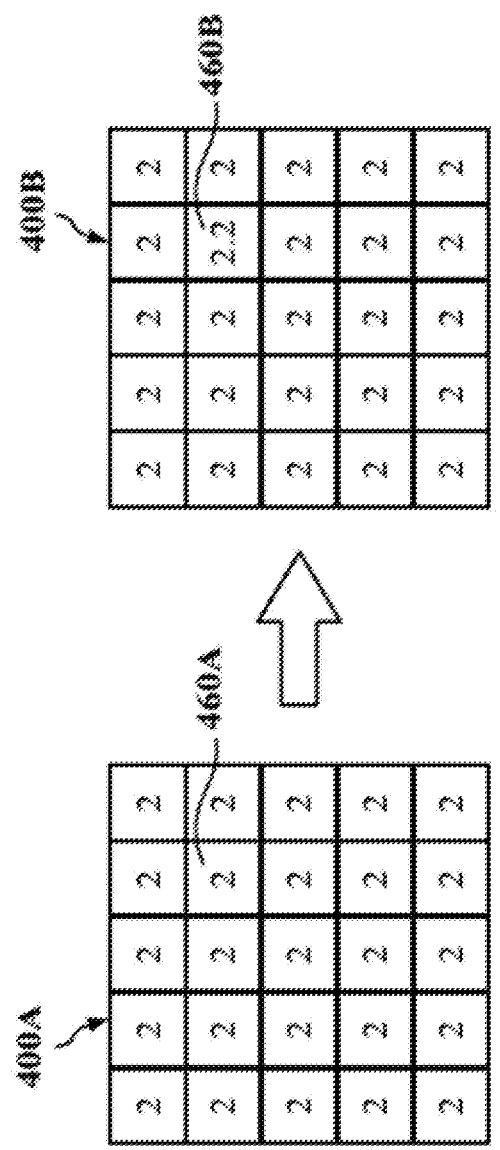
FIG. 4 illustrates an example of a data structure that may be used to represent the 3D mesh, in accordance with particular embodiments.

FIG. 4 illustrates an example of a data structure (e.g., a depth map) that may be used to represent the 3D mesh. In particular embodiments, the depth values that define the shape of the 3D mesh (e.g., mesh 300A shown in FIG. 3A) may be stored within a matrix 400A. The vertices of the primitives that form the mesh 300A may each have a corresponding cell in the matrix 400A, where the depth value of that vertex is stored. In particular embodiments, the coordinates of each cell within the matrix 400A may correspond to the radial coordinates of the vertex in the mesh, as measured relative to the viewer 310. Initially, the depth stored in each cell of the matrix 400A may be initialized to the same distance (e.g., 2 meters), which would result in the hemispheric mesh 300A shown in FIG. 3A. Based on the ray casting process described above, the depth values stored in the matrix 400A may be updated. For example, referring again to FIG. 3A, the ray 330 that was cast towards point 320A may intersect the mesh at location 340. The computing device may determine that the location 340 on the mesh 300A corresponds to cell 460A in the matrix 400A. The current depth stored in cell 460A may be updated to reflect the depth value of point 320A, which is 2.2 meters in the particular example given. As a result, the updated matrix 400B stores 2.2 as the depth value in the updated cell 460B. As previously mentioned, the number of verified depth measurements in the point cloud may be sparse, which in turn would lead to the mesh having incomplete information (e.g., a cell may not get updated). Thus, in particular embodiments, after the entire matrix has been updated based on the available points in the point cloud, the updated matrix may be processed using a Poisson smoothing technique (e.g., Poisson Solver) or any other suitable technique to, in effect, smooth the contours of the splines of the 3D mesh and filling missing depth values in the matrix. The Poisson smoothing technique is, therefore, being tasked to solve the problem of having incomplete depth data in the matrix representing the 3D mesh. The result is a 3D mesh contour that represents the depth of the observed world.

The mesh generated above may be computed from sparse 3D points (e.g., computed using motion vector stereo data). Changes in camera sensor noisek lighting conditions, scene content, etc., may cause fluctuations in the sprase 3D point set. These fluctuations make their way into the mesh and may cause intermittent warping, bending, bubbling and wiggling of the resulting video frames rendered using the mesh. As previously described at least with reference to FIG. 2, the temporal smoothness problem may be alleviated by applying a temporal filter on the point cloud generated using, e.g., motion vectors. In particular embodiments described above, the point cloud resulting from the filtering process may then be projected onto a hemisphere to generate a 3D mesh, and a Poisson smoothing technique or any other suitable smoothing technique may be applied to fill in missing depth information and improve the smoothness of the mesh.

To further improve temporal smoothness, particular embodiments may generate the 3D mesh (or its corresponding depth map data structure) using not only the sparse point cloud (e.g., the vetted points that survived the filtering process) generated form the current image capture but also additional points from completed 3D meshs generated in previous time instances. For example, at a current time t, a 3D mesh may be generated based on (1) the sparse point cloud generated using images observed at time t and (2) the 3D mesh generated for time t−1. Since the 3D depth information at time t−1 is relative to the user's viewpoint at time t−1, that 3D depth information would need to be projected to the current user's viewpoint at time t. The projected depth information may then supplement the point cloud generated at time t. The supplemented data set of depth information may then be used to generate a 3D mesh (e.g., by projecting the points in the supplemented data set onto a hemisphere). The generated 3D mesh may in turn be processed using a Poisson smoothing technique or any other suitable smoothing technique to fill in missing depth information and improve the smoothness of the mesh.

Figure 5:
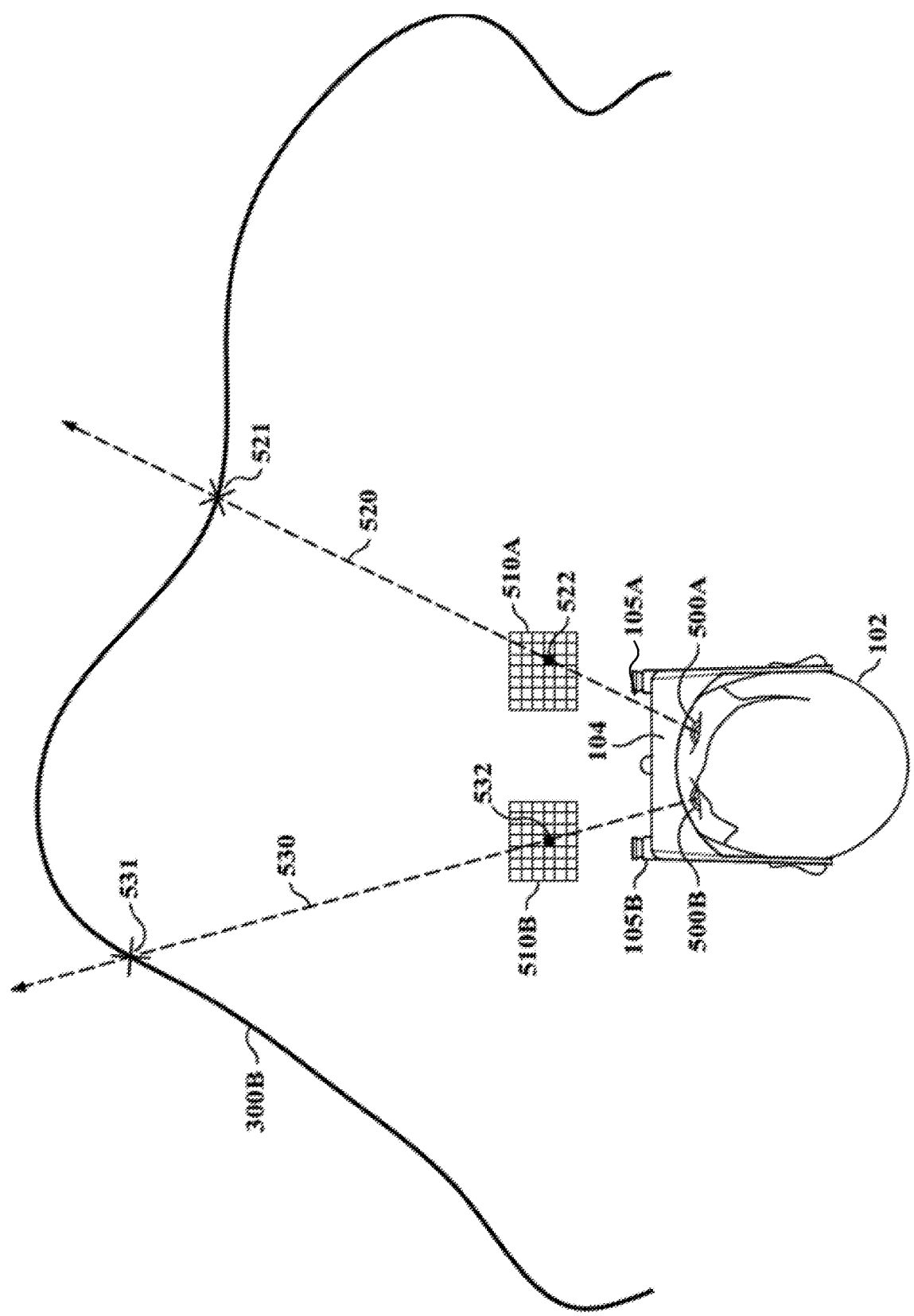
FIG. 5 provides an illustration of 3D-passthrough rendering based on the 3D mesh, in accordance with particular embodiments.

FIG. 5 provides an illustration of 3D-passthrough rendering based on the 3D mesh. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 500A and 500B using offsets from the pose of the HMD 104. The system may then render a passthrough image for each of the user's eyes 500A-B. For example, to render a passthrough image for the user's right eye 500A, the system may cast a ray 520 from the estimated viewpoint of the right eye 500A through each pixel of a virtual screen space 510A to see which portion of the mesh 300B the rays would intersect. This ray casting process may be referred to as a visibility test, as the objective is to determine what is visible from the selected viewpoint 500A. In the particular example shown, the ray 520 projected through a particular pixel 522 intersects with a particular point 521 on the mesh. This indicates that the point of intersection 521 is to be displayed by the pixel 522. Once the point of intersection 521 is found, the rendering system may sample a corresponding point in a texture image that is mapped to the point of intersection 521. In particular embodiments, the image captured by the cameras 105A-B of the HMD 104 may be used to generate a texture for the mesh 300B. Doing so allows the rendered image to appear more like the actual physical object. In a similar manner, the rendering system may render a passthrough image for the user's left eye 500B. In the example shown, a ray 530 may be cast from the left-eye viewpoint 500B through pixel 532 of the left screen space 510B. The ray 530 intersects the mesh 300B at location 531. The rendering system may then sample a texture image at a texture location corresponding to the location 531 on the mesh 300B and compute the appropriate color to be displayed by pixel 532. Since the passthrough images are re-rendered from the user's viewpoints 500A-B, the images would appear natural and provide proper parallax effect.

Figure 6:
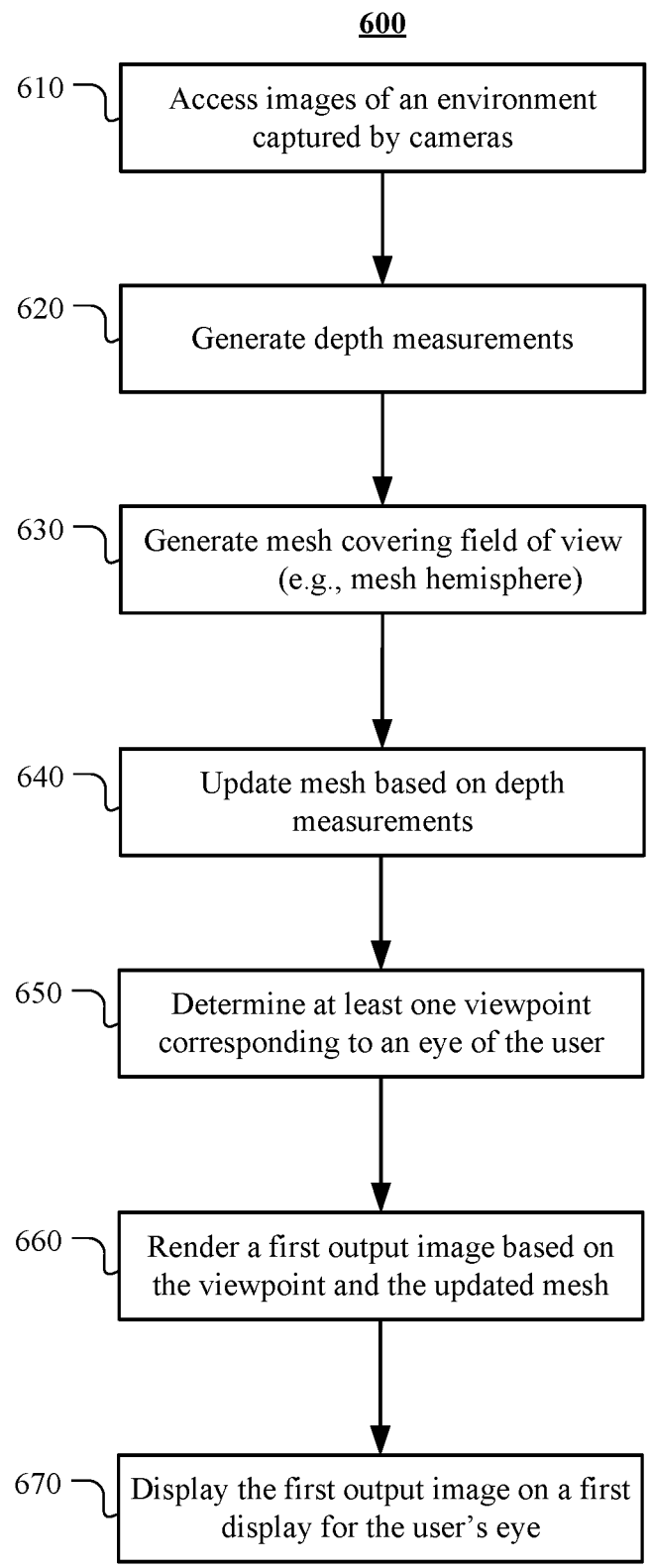
FIG. 6 illustrates an example method for rendering 3D passthrough, in accordance with particular embodiments.

FIG. 6 illustrates an example method 600 for rendering 3D passthrough. The method may begin at step 610, where a computing system associated with an artificial reality device may access images of an environment captured by cameras of the device (e.g., an HMD) worn by a user. The device may be a head-mounted device that blocks the user from seeing the environment directly. The images may be stereo image pairs captured simultaneously by two cameras with a shared field of view.

At step 620, the system may generate, based on the images, depth measurements of objects in the environment. As described in further detail above, the manner in which the depth measurements are generated may depend on the available system resources. If the computing system has a GPU and processing availability, the system may use the GPU to compute correspondences between stereo image pairs using optical flow. But for computer systems that lack the capability or resource availability to do so, they may instead re-purpose their video encoders to compute correspondences. For example, the computing system may instruct a video encoder to generate a motion vector based on the images and compute the depth measurements using the motion vector. In particular embodiments, the pixel correspondences that are used for depth computation and mesh generation may need to pass a reliability verification process. The system may use one or more verification techniques to verify the pixel correspondences identified by the motion vector. For example, the system may verify each of the pixel correspondences based on a corresponding epipolar line, as described in further detail above. Additionally or alternatively, the system may compute a depth measurement for one or more of the pixel correspondences and verify that the depth measurement is observed in one or more subsequent images captured by the cameras of the device at different times. If this temporal verification process is performed after the epipolar verification process, then the temporal verification process may only need to test those correspondences that passed the epipolar verification process. The verified pixel correspondences may then be used to compute the depth measurements (e.g., using triangulation techniques).

At step 630, the system may generate a mesh covering a field of view of the user. As shown in FIG. 3A, the initial mesh may be a hemisphere, or a portion thereof, whose vertices are equal-distance from and centered around the device or viewer. In other embodiments, the mesh may be a flat surface that covers the user's field of view.

At step 640, the system may update the mesh based on the depth measurements to represent a contour of the objects in the environment. In particular embodiments, the system may, for each of the depth measurements, project a ray through a point representation of that depth measurement. The system may then determine a location on the mesh intersected by the ray and update a depth value associated with the location on the mesh based on that depth measurement. In particular embodiments, the system may further smooth the contour represented by the mesh and generate depth values in regions of the mesh where depth values are missing using, for example, Poisson smoothing techniques.

At step 650, the system may determine a first viewpoint of a first eye of the user (e.g., the right eye). In embodiments where the HMD has one display per eye, the system may further determine a second viewpoint of a second eye of the user (e.g., the left eye).

At step 660, the system may render a first output image based on the first viewpoint and the updated mesh. If a second output image is desired for the user's other eye, the system may further render the second output image based on the second viewpoint and the updated mesh.

At step 670, the system may display the first output image on a first display of the device and/or the second output image on a second display of the device. The first display is configured to be viewed by the first eye of the user and the second display is configured to be viewed by the second eye of the user.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating 3D passthrough, including the particular steps of the method of FIG. 6, this disclosure contemplates any suitable method for generating 3D passthrough, including any suitable steps, which may include a subset of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
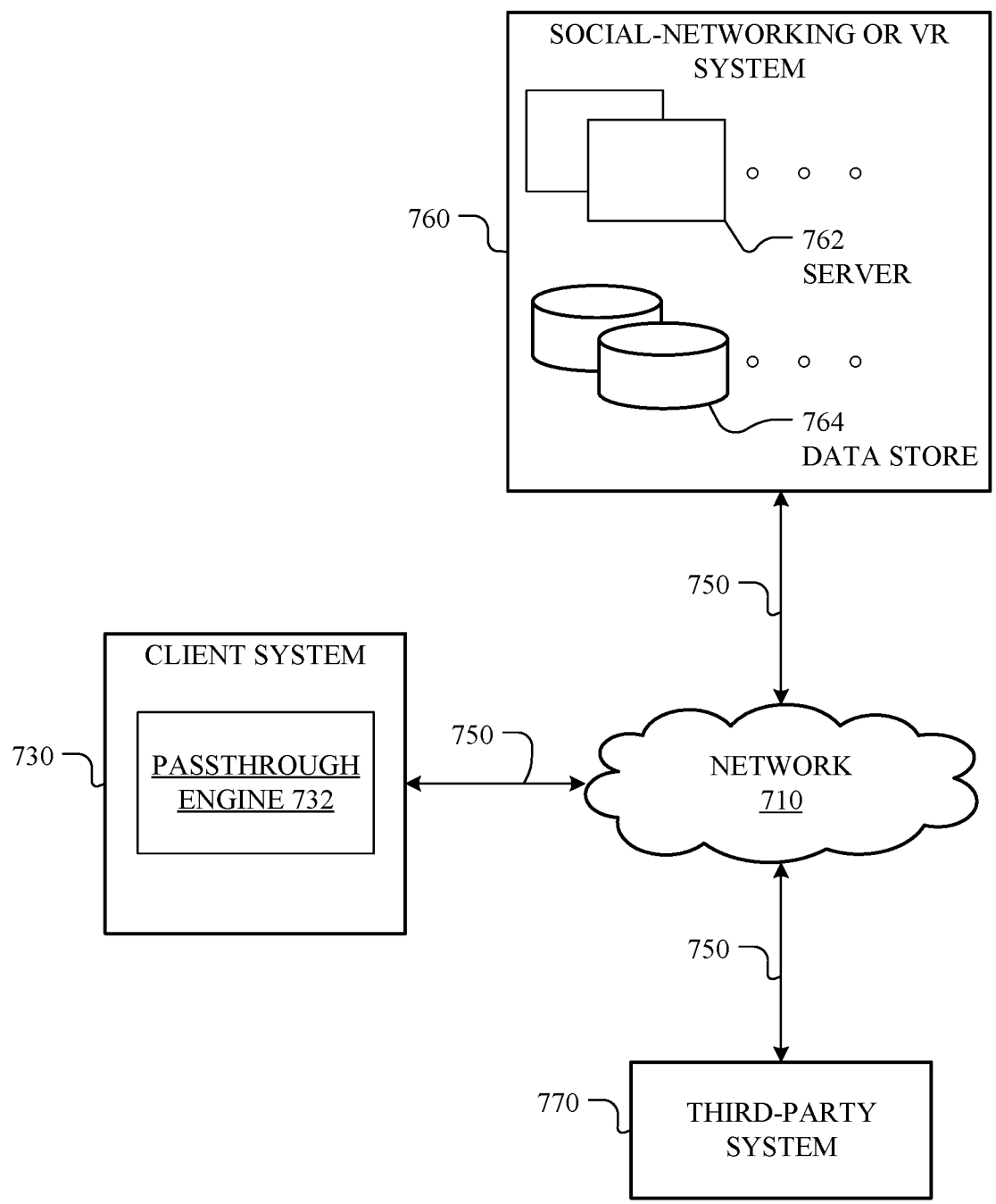
FIG. 7 illustrates an example network environment associated with a VR or social-networking system.

FIG. 7 illustrates an example network environment 700 associated with a VR or social-networking system. Network environment 700 includes a client system 730, a VR or social-networking system 760, and a third-party system 770 connected to each other by a network 710. Although FIG. 7 illustrates a particular arrangement of client system 730, VR or social-networking system 760, third-party system 770, and network 710, this disclosure contemplates any suitable arrangement of client system 730, VR or social-networking system 760, third-party system 770, and network 710. As an example and not by way of limitation, two or more of client system 730, VR or social-networking system 760, and third-party system 770 may be connected to each other directly, bypassing network 710. As another example, two or more of client system 730, VR or social-networking system 760, and third-party system 770 may be physically or logically co-located with each other in whole or in part. Moreover, although FIG. 7 illustrates a particular number of client systems 730, VR or social-networking systems 760, third-party systems 770, and networks 710, this disclosure contemplates any suitable number of client systems 730, VR or social-networking systems 760, third-party systems 770, and networks 710. As an example and not by way of limitation, network environment 700 may include multiple client system 730, VR or social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 (e.g., an HMD) may include a passthrough engine 732 to provide the passthrough feature described herein, and may have one or more add-ons, plug-ins, or other extensions. A user at client system 730 may connect to a particular server (such as server 762, or a server associated with a third-party system 770). The server may accept the request and communicate with the client system 730.

In particular embodiments, VR or social-networking system 760 may be a network-addressable computing system that can host an online Virtual Reality environment or social network. VR or social-networking system 760 may generate, store, receive, and send social-networking data, such as, for example, user-profile data, concept-profile data, social-graph information, or other suitable data related to the online social network. Social-networking or VR system 760 may be accessed by the other components of network environment 700 either directly or via network 710. As an example and not by way of limitation, client system 730 may access social-networking or VR system 760 using a web browser, or a native application associated with social-networking or VR system 760 (e.g., a mobile social-networking application, a messaging application, another suitable application, or any combination thereof) either directly or via network 710. In particular embodiments, social-networking or VR system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking or VR system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking or VR system 760, or a third-party system 770 to manage, retrieve, modify, add, or delete, the information stored in data store 764.

In particular embodiments, social-networking or VR system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 760 may provide users of the online social network the ability to communicate and interact with other users. In particular embodiments, users may join the online social network via social-networking or VR system 760 and then add connections (e.g., relationships) to a number of other users of social-networking or VR system 760 to whom they want to be connected. Herein, the term "friend" may refer to any other user of social-networking or VR system 760 with whom a user has formed a connection, association, or relationship via social-networking or VR system 760.

In particular embodiments, social-networking or VR system 760 may provide users with the ability to take actions on various types of items or objects, supported by social-networking or VR system 760. As an example and not by way of limitation, the items and objects may include groups or social networks to which users of social-networking or VR system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 760 or by an external system of third-party system 770, which is separate from social-networking or VR system 760 and coupled to social-networking or VR system 760 via a network 710.

In particular embodiments, social-networking or VR system 760 may be capable of linking a variety of entities. As an example and not by way of limitation, social-networking or VR system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking or VR system 760. In particular embodiments, however, social-networking or VR system 760 and third-party systems 770 may operate in conjunction with each other to provide social-networking services to users of social-networking or VR system 760 or third-party systems 770. In this sense, social-networking or VR system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 760 also includes user-generated content objects, which may enhance a user's interactions with social-networking or VR system 760. User-generated content may include anything a user can add, upload, send, or "post" to social-networking or VR system 760. As an example and not by way of limitation, a user communicates posts to social-networking or VR system 760 from a client system 730. Posts may include data such as status updates or other textual data, location information, photos, videos, links, music or other similar data or media. Content may also be added to social-networking or VR system 760 by a third-party through a "communication channel," such as a newsfeed or stream.

In particular embodiments, social-networking or VR system 760 may include a variety of servers, sub-systems, programs, modules, logs, and data stores. In particular embodiments, social-networking or VR system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 760 may also include suitable components such as network interfaces, security mechanisms, load balancers, failover servers, management-and-network-operations consoles, other suitable components, or any suitable combination thereof. In particular embodiments, social-networking or VR system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 760 to one or more client systems 730 or one or more third-party system 770 via network 710. The web server may include a mail server or other messaging functionality for receiving and routing messages between social-networking or VR system 760 and one or more client systems 730. An API-request server may allow a third-party system 770 to access information from social-networking or VR system 760 by calling one or more APIs. An action logger may be used to receive communications from a web server about a user's actions on or off social-networking or VR system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking or VR system 760. A privacy setting of a user determines how particular information associated with a user can be shared. The authorization server may allow users to opt in to or opt out of having their actions logged by social-networking or VR system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
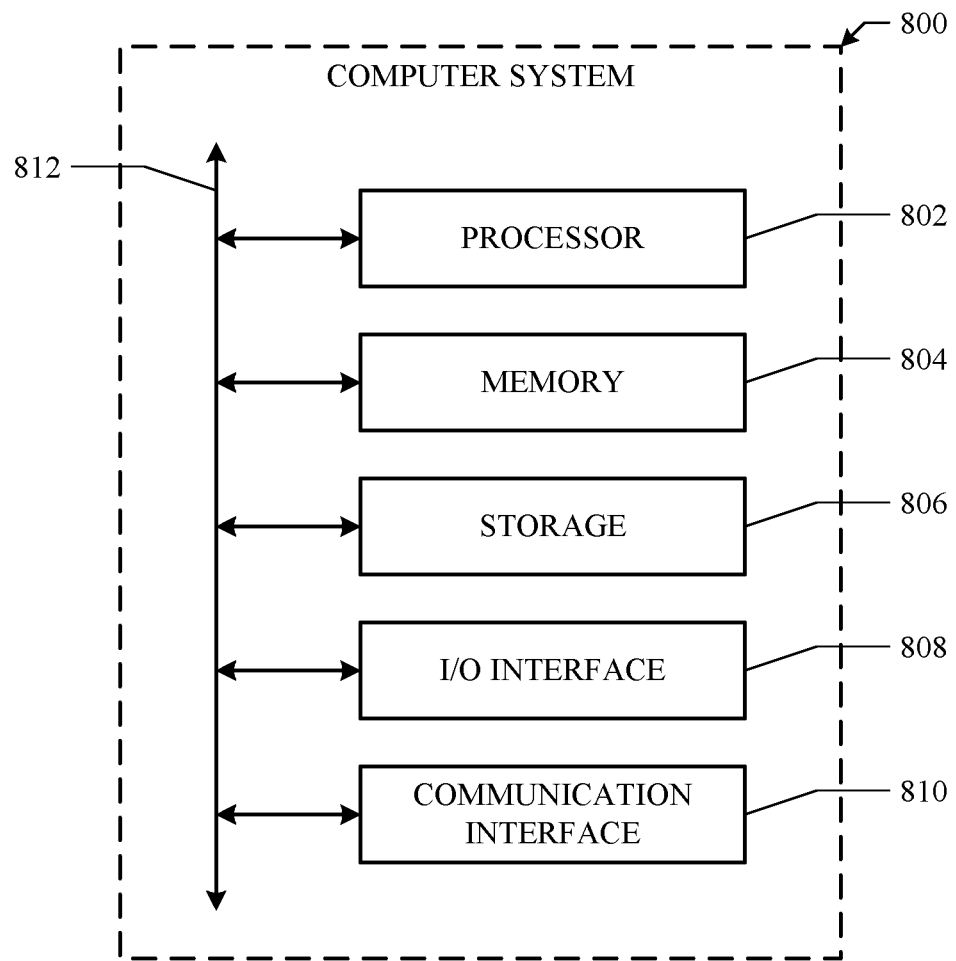
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing images of an environment captured by cameras of a virtual-reality device worn by a user, the virtual-reality device blocking the user from seeing the environment directly;
   generating, based on the images, depth measurements of objects in the environment;
   generating a mesh covering a field of view of the user;
   updating the mesh based on the depth measurements to represent a contour of the objects in the environment;
   determining a first viewpoint of a first eye of the user;
   casting a ray from the first viewpoint of the first eye of the user into a three-dimensional (3D) space;
   rendering a first output image for a first display of the virtual-reality device worn by the user based on a particular point at which the ray casted from the first viewpoint of the first eye of the user intersects on the updated mesh representing the contour of the objects in the environment; and
   displaying the first output image on the first display of the virtual-reality device, the first display being configured to be viewed by the first eye of the user.

2. The method of claim 1, wherein the virtual-reality device is a head-mounted device.

3. The method of claim 1, wherein generating the depth measurements of the objects in the environment comprises:
   instructing a video encoder to generate a motion vector based on the images; and
   computing the depth measurements using the motion vector.

4. The method of claim 3, wherein generating the depth measurements of the objects in the environment further comprises verifying pixel correspondences identified by the motion vector, wherein the depth measurements are computed based on the verified pixel correspondences.

5. The method of claim 4, wherein verifying the pixel correspondences identified by the motion vector comprises:
   verifying each of the pixel correspondences based on a corresponding epipolar line.

6. The method of claim 4, wherein verifying the pixel correspondences identified by the motion vector further comprises:
   computing a depth measurement for at least one of the pixel correspondences; and
   verifying that the depth measurement is observed in one or more subsequent images captured by the cameras of the virtual-reality device.

7. The method of claim 1, wherein the generated mesh forms at least a portion of a hemisphere centered around the virtual-reality device.

8. The method of claim 1, wherein updating the mesh based on the depth measurements comprises, for each of the depth measurements:
projecting a second ray through a point representation of that depth measurement;
determining a location on the mesh intersected by the second ray; and
updating a depth value associated with the location on the mesh based on that depth measurement.

9. The method of claim 8, wherein updating the mesh based on the depth measurements further comprises processing the mesh using a Poisson smoothing technique.

10. The method of claim 1, further comprising:
determining a second viewpoint of a second eye of the user;
casting a second ray from the second viewpoint of the second eye of the user into the 3D space;
rendering a second output image for a second display of the virtual-reality device worn by the user based on a particular second point at which the second ray casted from the second viewpoint of the second eye of the user intersects on the updated mesh representing the contour of the objects in the environment; and
displaying the second output image on the second display of the virtual-reality device, the second display being configured to be viewed by the second eye of the user.

11. The method of claim 1, wherein updating the mesh is further based on a previous mesh generated prior to the mesh.

12. The method of claim 11, wherein updating the mesh further comprises:
transforming previous depth values associated with the previous mesh to a viewpoint associated with the depth measurements generated based on the accessed images; and
projecting the transformed previous depth values and the depth measurements generated based on the accessed images to update the mesh.

13. One or more computer-readable non-transitory storage media embodying software that is operable when executed to:
access images of an environment captured by cameras of a virtual-reality device worn by a user, the virtual-reality device blocking the user from seeing the environment directly;
generate, based on the images, depth measurements of objects in the environment;
generate a mesh covering a field of view of the user;
update the mesh based on the depth measurements to represent a contour of the objects in the environment;
determine a first viewpoint of a first eye of the user;
cast a ray from the first viewpoint of the first eye of the user into a three-dimensional (3D) space;
render a first output image for a first display of the virtual-reality device worn by the user based on a particular point at which the ray casted from the first viewpoint of the first eye of the user intersects on the updated mesh representing the contour of the objects in the environment; and
display the first output image on the first display of the virtual-reality device, the first display being configured to be viewed by the first eye of the user.

14. The media of claim 13, wherein the software is further operable when executed to:
instruct a video encoder to generate a motion vector based on the images; and
compute the depth measurements using the motion vector.

15. The media of claim 14, wherein the software is further operable when executed to verify pixel correspondences identified by the motion vector, wherein the depth measurements are computed based on the verified pixel correspondences.

16. The media of claim 13, wherein the software is further operable when executed to, for each of the depth measurements:
project a second ray through a point representation of that depth measurement;
determine a location on the mesh intersected by the second ray; and
update a depth value associated with the location on the mesh based on that depth measurement.

17. A system comprising:
one or more processors; and
one or more computer-readable non-transitory storage media coupled to one or more of the processors and comprising instructions operable when executed by one or more of the processors to cause the system to:
access images of an environment captured by cameras of a virtual-reality device worn by a user, the virtual-reality device blocking the user from seeing the environment directly;
generate, based on the images, depth measurements of objects in the environment;
generate a mesh covering a field of view of the user;
update the mesh based on the depth measurements to represent a contour of the objects in the environment;
determine a first viewpoint of a first eye of the user;
cast a ray from the first viewpoint of the first eye of the user into a three-dimensional (3D) space;
render a first output image for a first display of the virtual-reality device worn by the user based on a particular point at which the ray casted from the first viewpoint of the first eye of the user intersects on the updated mesh representing the contour of the objects in the environment; and
display the first output image on the first display of the virtual-reality device, the first display being configured to be viewed by the first eye of the user.

18. The system of claim 17, wherein the processors are further operable when executing the instructions to:
instruct a video encoder to generate a motion vector based on the images; and
compute the depth measurements using the motion vector.

19. The system of claim 18, wherein the processors are further operable when executing the instructions to verify pixel correspondences identified by the motion vector, wherein the depth measurements are computed based on the verified pixel correspondences.

20. The system of claim 17, wherein the processors are further operable when executing the instructions to, for each of the depth measurements:
project a second ray through a point representation of that depth measurement;
determine a location on the mesh intersected by the second ray; and
update a depth value associated with the location on the mesh based on that depth measurement.

* * * * *